United States Patent [19]

Grasso et al.

[11] Patent Number: 5,087,108
[45] Date of Patent: Feb. 11, 1992

[54] DOUBLE-CORE ACTIVE-FIBER OPTICAL AMPLIFIER HAVING A WIDE-BAND SIGNAL WAVELENGTH

[75] Inventors: Giorgio Grasso, Monza, Italy; Paul L. Scrivener, Southampton Hampshire, Great Britain; Andrew P. Appleyard, Monza, Italy

[73] Assignee: Societa' Cavi Pirelli S.p.A., Milan, Italy

[21] Appl. No.: 553,246

[22] Filed: Jul. 13, 1990

[30] Foreign Application Priority Data

Aug. 11, 1989 [GB] United Kingdom ............... 8918377
Feb. 12, 1990 [IT] Italy ........................ 19340 A/90

[51] Int. Cl.$^5$ ............................................. G02B 6/26
[52] U.S. Cl. ................................... 385/27; 372/6; 385/126; 385/142; 359/341
[58] Field of Search ............ 350/96.33, 96.15, 96.29, 350/96.34; 372/6, 69

[56] References Cited

U.S. PATENT DOCUMENTS 4,546,476 10/1985 Shaw et al. ............... 350/96.15 X
4,723,824 2/1988 Shaw et al. ............... 350/96.15
4,959,837 9/1990 Février et al. ............ 372/6

FOREIGN PATENT DOCUMENTS 0294037 12/1988 European Pat. Off. .
0324541 7/1989 European Pat. Off. .

OTHER PUBLICATIONS

Patent Abstracts of Japan, vol. 11, No. 156 (p-578) [2603], 21st May 1987; and JP-A-61 292 102 (Nippon Telegr. & Teleph. Corp.) 22-12-1986.

Primary Examiner—John D. Lee
Assistant Examiner—John Ngo
Attorney, Agent, or Firm—Brooks Haidt Haffner & Delahunty

[57] ABSTRACT

The invention relates to an optical amplifier, in particular for optical fiber telecommunication lines (1), operating with a transmission signal in a predetermined wavelength range, which amplifier comprises a fluorescent active optical fiber (6) doped with erbium, having two cores (11 and 12, 101 and 102), one (11, 101) of which is connected to a fiber (4) in which a transmission signal to be amplified and a luminous pumping energy are multiplexed, and to an outgoing fiber adapted to transmit the amplified signal, whereas the second core (12, 102) is optically coupled to the first core and is capable of absorbing the spontaneous erbium emission which would constitute a noise source, allowing a signal to be amplified in a wavelength range substantially corresponding to the tolerance range of the commercially available signal laser emitters.

25 Claims, 3 Drawing Sheets

DOUBLE-CORE ACTIVE-FIBER OPTICAL AMPLIFIER HAVING A WIDE-BAND SIGNAL WAVELENGTH

BACKGROUND OF THE INVENTION

1. Field of the Invention

The present invention relates to an optical fiber containing fluorescent doping substances, adapted to carry out the amplification of an optical transmission signal sent thereto and to eliminate radiations having an undesired wavelength, produced at the inside thereof by spontaneous emission.

2. Description of the Related Art

It is known that optical fibres having rare-earth doped cores may be used in optical amplifiers. For example, erbium doped cores pumped with a suitable wavelength pump source (for example 532, 670, 807, 980, or 1490 nm) can be used as a travelling wave amplifier for optical signals in the 1550 nm telecommunications wavelength region.

These fibres in fact can be supplied by a light source having a particular wavelength which is capable of bringing the doping substance atoms to an excited energetic state, or pumping band, from which the atoms spontaneously decay in a very short time to a laser emission state, in which state they stand for a relatively longer time.

When a fiber having a high number of atoms in excited state in the emission level is crossed by a luminous signal with a wavelength corresponding to such emission laser state, the signal causes the transition of the excited atoms to a lower level with a light emission having the same wavelength as the signal; therefore a fiber of this kind can be used to achieve an optical signal amplification.

Starting from the excited state the atom decay can occur also spontaneously, which gives rise to a random emission constituting a "background noise" overlapping the stimulated emission, corresponding to the amplified signal.

The light emission generated by the introduction of luminous pumping energy into the "doped" or active fiber can take place at several wavelengths, typical of the doping substance, so as to give origin to a fluorescence spectrum of the fiber.

In order to achieve the maximum signal amplification by means of a fiber of the above type, together with a high signal-to-noise ratio, in optical telecommunications it is normally used a signal generated by a laser emitter having a wavelength corresponding to a maximum of the fluorescence spectrum curve of the fiber incorporating the doping substance used.

In particular, when optical telecommunication signal amplifications are concerned, the use of "active" fibres having a core doped with erbium ions ($Er^{3+}$) is convenient.

However, the spectral gain profile of an erbium doped core in an amplifier of the type above described is characterized by two gain bands. One narrow gain band is centred around 1530 nm and a second broader but lower level gain band is centred around 1550 nm.

The peak wavelengths of the gain bands and their spectral widths are dependent on the host glass composition of the core. For example silica cores doped with erbium and germania have the higher gain band peak wavelength at 1536 nm and silica cores doped with erbium and alumina have the higher gain band peak wavelength at 1532 nm.

In both cases, the higher gain band has a "3 dB linewidth" of about 3 to 4 nm, and the lower level gain band, depending on the host glass composition is broader with a "3dB linewidth" of about 30 nm. The former gain band exhibits greater gain than the latter but requires the signal to be amplified to have a very stable, tightly specified centre wavelength.

This dictates the use, as the transmission signal source, of a laser emitter operating to a well defined wavelength with a limited tolerance, because signals exceeding such tolerance limits would not be properly amplified, while at the same time a strong spontaneous emission would occur at this peak wavelength which would give rise to a background noise capable of greatly impairing the transmission quality.

Laser emitters having the above features, that is operating at the erbium emission peak, are however of difficult and expensive production, whereas the common industrial production offers laser emitters such as semiconductor lasers (In, Ga, As), exhibiting several features making them suitable for use in telecommunications but having a rather large tolerance as regards the emission wavelength and therefore only a reduced number of laser emitters of this kind has an emission at the above peak wavelength.

While in some applications, such as for example submarine telecommunications, the choice can be accepted of using transmission signal emitters operating at a well defined wavelength value, for example obtained through an accurate selection from lasers of commercial quality so as to use only those having an emission strictly close to the laser emission peak of the amplifier fiber, this procedure is not acceptable from an economical point of view when other kinds of lines are concerned, such as for example municipal communication lines where it is of great importance to limit the installation costs.

For example, an erbium-doped fiber adapted to allow the laser emission has an emission peak at approximately 1536 nm and over a range of a $\pm 5$ nm from said emission value it has a high intensity and can be used to amplify a signal in the same wavelength range; however, commercially available semiconductor lasers to be used for transmission are usually made with emission wavelength values in the range of 1520 to 1570 nm.

As a result, a great number of commercially available lasers are at the outside of the range adapted for the erbium-based amplification and therefore cannot be employed for generating telecommunication signals in lines provided with erbium-based amplifiers of the above type.

On the other hand it is known that erbium-doped fibres have the above discussed second gain band in the emission spectrum with a relatively high and substantially constant intensity in a wavelength range contiguous to the above described narrow gain peak, wide enough to include therein the emission range of the above mentioned commercially available lasers.

However, in an optical fiber of this type a signal having wavelength in the second gain band would be amplified in a reduced measure, whereas spontaneous transitions from the laser emission state in the fiber mainly take place with the emission at the wavelength of the narrow gain band at 1536 nm, thus generating a "background noise" which will be further amplified through the active fiber length and will overlap the useful signal.

It may be envisaged to carry out the filtering of the luminous emission constituting the "noise" at the end of the amplifier fiber, sending to the line the only wavelength of the transmission signal, for the purpose providing a suitable filter at the end of the active fiber.

However the presence of a spontaneous emission in the fiber mainly at the wavelength of the fiber maximum amplification would subtract pumping energy to the transmission signal amplification having a different wavelength, thus making the fiber substantially inactive as regards the amplification of the signal itself.

The problem arises therefore of providing an active optical fiber to be employed in optical amplifiers which is adapted to be used together with commercially available laser emitters for the emission of the transmission signal without important qualitative restrictions being imposed to said laser emitters.

SUMMARY OF THE INVENTION

The present invention aims at providing a doped optical fiber capable of offering a satisfactory amplification in a sufficiently wide wavelength range, so as to allow commercially available laser emitters to be used while preventing the spontaneous emissions of the material to an undesired wavelength from impairing the amplification capability of the fiber and constituting a background noise of great intensity with respect to the transmission signal.

These results are achieved by an optical amplifier according to the appended claims.

BRIEF DESCRIPTION OF THE DRAWINGS

More details will become apparent from the following description of the invention made with reference to the accompanying drawings, in which.

DESCRIPTION OF THE PREFERRED EMBODIMENTS

Figure 1:
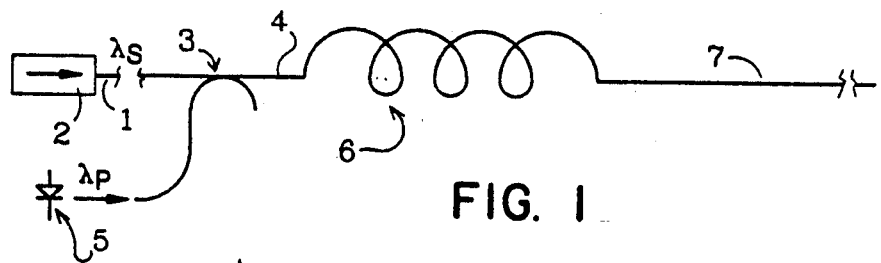
FIG. 1 is a diagram of an optical amplifier using an active fiber.

In order to amplify optical telecommunication signals, fiber-made amplifiers can be suitably used; the structure of these amplifiers is diagrammatically shown in FIG. 1 where reference 1 denotes an optical telecommunication fiber, to which a transmission signal is sent which has a wavelength $\lambda_s$ and is generated by a signal emission laser 2.

Said signal, which attenuates after a certain line length, is sent to a dichroic coupler 3 where it is joined on a sole outgoing fiber 4, to a pumping signal having a wavelength $\lambda_p$ and generated by a pumping laser emitter 5.

An active fiber 6, connected to the fiber 4 coming out of the coupler, constitutes the signal amplifying element which is then introduced into the line fiber 7 in order to go on towards its destination.

For the accomplishment of the active fiber 6 constituting the amplifying element in the unit, according to a preferred embodiment of the invention it is convenient to use a silica-based optical fiber doped with $Er_2O_3$ which allows an advantageous amplification of the transmission signal to be achieved by exploiting the laser transitions of erbium.

The desired refraction index profile in the fiber is conveniently obtained with a doping with germania or alumina.

Figure 2:
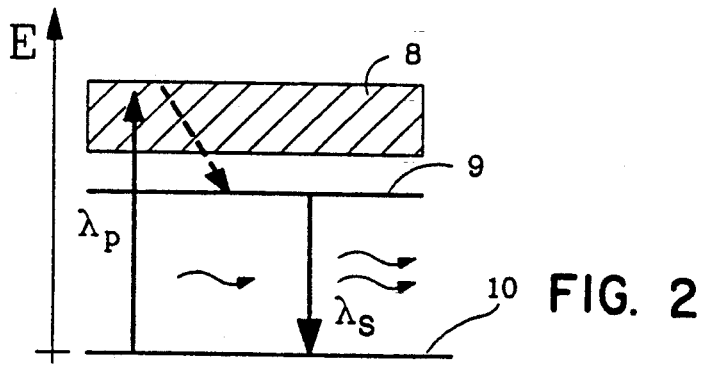
FIG. 2 is a diagram of the energetic transitions of the fluorescent doping substance in a fiber of the type to be used for an amplifier according to the diagram shown in FIG. 1, which transitions are adapted to generate a stimulated (laser) emission at a transmission signal.

As shown in the diagram in FIG. 2 relating to a fiber of the specified type and symbolically showing the available energetic states for an erbium ion in solution in the fiber silica-based matrix, the introduction into the active fiber of a luminous power at the pumping wavelength $\lambda_p$, lower than the transmission signal wavelength $\lambda_s$, brings a certain number of $Er^{3+}$ ions present in the fiber glass matrix as doping substance to an "excited" energetic state 8, hereinafter referred to as "pumping" band, from which state ions spontaneously decay to an energetic level 9 constituting the laser emission level.

In the laser emission level 9 $Er^{3+}$ ions can stand for a relatively long time before undergoing a spontaneous transition up to a base level 10.

It is known that while the transition from band 8 to level 9 is associated with a thermal-type emission, which is dispersed to the outside of the fiber (phonon radiation), the transition from level 9 to the base level 10 generates a luminous emission at a wavelength corresponding to the magnetic value of the laser emission level 9.

In a fiber containing a high amount of ions at the laser emission level is passed through by a signal having a wavelength corresponding to such emission level, the signal causes the stimulated transition of the concerned ions from the emission state to the base state before the spontaneous decay thereof, through a cascade phenomenon producing the emission of a greatly amplified transmission signal at the output of the active fiber.

In the absence of the transmission signal the spontaneous decay from the laser emission states, which represent a discrete function typical of each substance, gives rise to a luminosity having peaks at different frequencies corresponding to the available levels.

Figure 3:
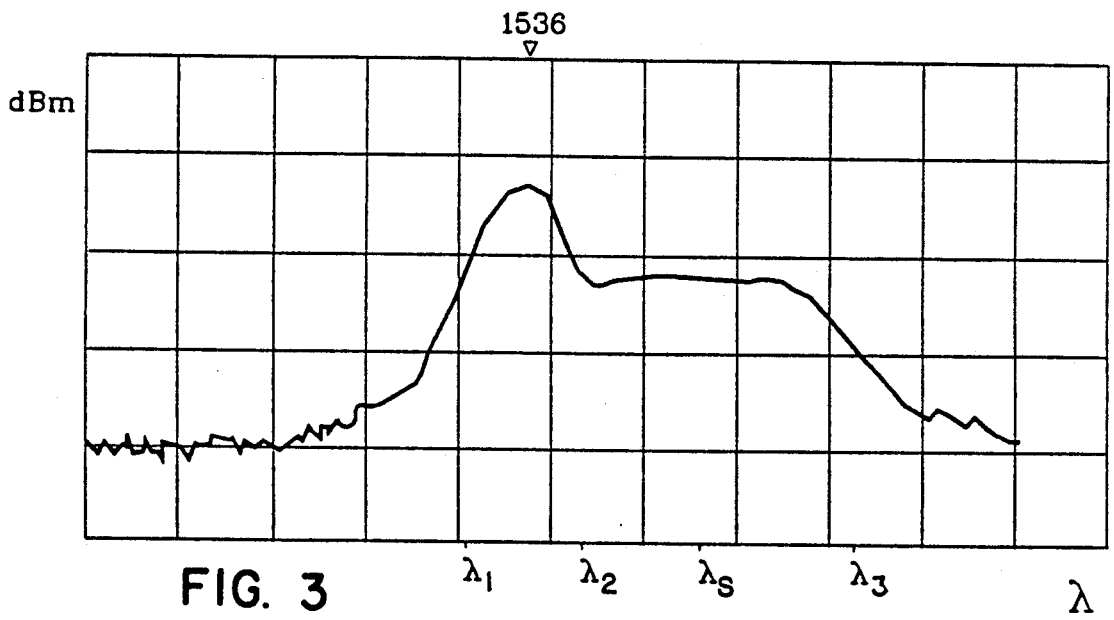
FIG. 3 is a diagram of the stimulated emission curve of a silica-based optical fiber, with $Er^{3+}$.
Figure 10:
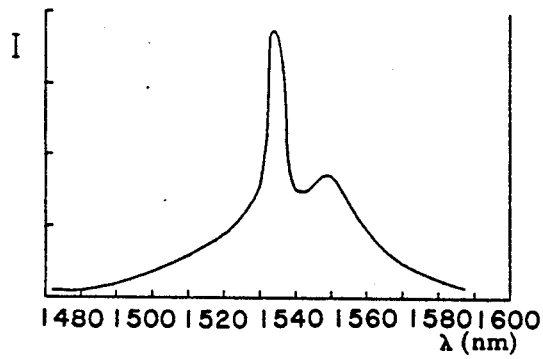
FIG. 10 shows the spectral gain profile of the amplifying core of the fiber of FIG. 8.

In particular, as shown in FIG. 3 or in FIG. 10, a Si/Al or a Si/Ge-type fiber, doped with $Er^{3+}$, adapted for use in optical amplifiers, at a 1536 nm wavelength exhibits a narrow emission peak of great intensity, whereas the higher wavelength, up to approximately 1560 nm, there is an area in which the emission still has a great intensity although lower than the intensity in the peak area, forming a broad emission peak.

In the presence of a luminous signal introduced into the fiber at the wavelength corresponding to the $Er^{3+}$ emission peak at 1536 nm, a very strong signal amplification occurs whereas the background noise given by the spontaneous emission of erbium keeps limited, which makes the fiber suitable for use in an optical amplifier for a signal of this wavelength.

For the signal generation, lasers of the semiconductor type (In, Ga, As) having a typical emission band in the range of 1.52 to 1.57 $\mu$m are commercially available and can be conveniently used: the foregoing means that their production technique is usable to ensure, for all pieces produced, the emission of the transmission signal at a precise frequency value corresponding to the narrow emission peak of the erbium-doped fiber used as the amplifier, offering on the contrary a great percentage of pieces in which the signal is localised in the areas of the fiber emission curve adjacent said narrow emission peak, in correspondence of the lower and broader emission peak above described.

The signal generated by said laser emitters could not be amplified reaching a sufficient gain in an $Er^{3+}$-doped optical fiber amplifier of the above described type because the pumping power introduced into the active fiber would be mostly used to amplify the background noise generated inside the active fiber of the amplifier itself, in connection with the spontaneous emission of erbium at 1536 nm wavelength.

Figure 4:
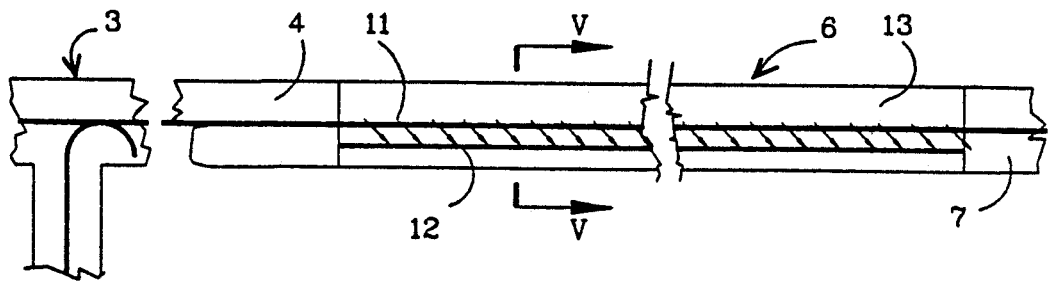
FIG. 4 is an enlarged diagrammatic view of an optical amplifier in accordance with the invention.
Figure 5:
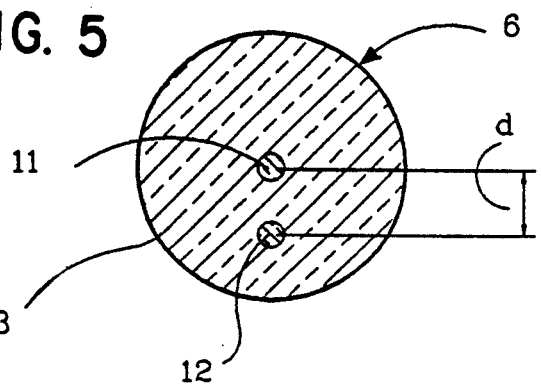
FIG. 5 is a sectional view of the active fiber of the amplifier taken along line V—V in FIG. 4.

Therefore, in view of using laser emitters of the above type and accepting them within the whole production tolerance range, in conjunction with erbium-based optical fiber amplifiers, that is to say, in general, in view of allowing particular types of laser signal emitters to be used in conjunction with fluorescent dopants having a strong background noise as a result of spontaneous transitions from the laser state, in accordance with the present invention provision has been made for the use of an active fiber of the type shown in cross-sectional view in FIGS. 4 and 5 which has two cores, 11 and 12 respectively, enclosed by the same cladding 13.

As diagrammatically shown in FIG. 4, the active fiber core 11 is connected at one end to the fiber 4 coming out of the dichroic coupler and at the opposite end to the line fiber 7, whereas the fiber core 12 is cut at both ends of the active fiber 6 and does not have other connections.

Figure 6:
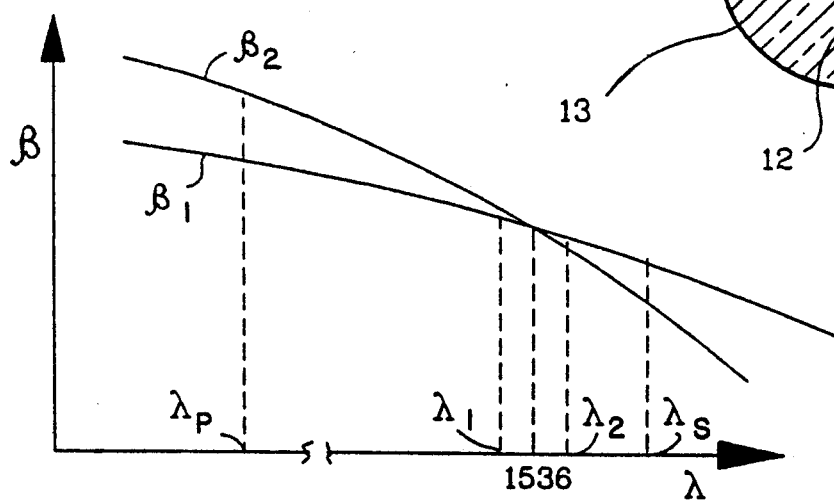
FIG. 6 is a graph of the light propagation constants in the active fiber cores according to the invention depending upon the wavelength.

The two cores 11 and 12 of fiber 6 are made so that the respective luminous propagation constants $\beta_1$ and $\beta_2$ within the fiber, the variation curves of which depending upon the wavelength are indicatively shown in FIG. 6, can accomplish the optical coupling between the two cores 11 and 12 when the wavelength of the dopant emitting peak of the core 11 has a maximum (at 1536 nm in the case of erbium) and within a range included between $\lambda_1$ and $\lambda_2$, the amplitude of which is given by the sloping of curves $\beta_1$ and $\beta_2$ and substantially corresponds, as shown in FIG. 3, to the amplitude of the narrow emission peak itself generating background noise.

The constants $\beta_1$, $\beta_2$ can be chosen for the desired coupling with correspondent choices of the numerical apertures of the cores, their diameters and their distance.

By way of the explanation, the optical power coupling $P_1$ and $P_2$ between two dissimilar cores 1 and 2 in a single cladding can be characterised by the following:

$$P_1(Z) = 1 - F \sin^2 C Z \qquad 1)$$

$$P_2(Z) = F \sin^2 C Z \qquad 2)$$

where $\quad F = 1/[1 - (B_d/C)^2] \qquad 3)$ $$C = (B_d^2 + N^2)^{\frac{1}{2}} \qquad 4)$$

$$B_d = (\beta_1 - \beta_2)/2 \qquad 5)$$

$$N = \frac{\sqrt[4]{S_1 S_2}}{\sqrt[4]{a_1 a_2}} \cdot \frac{U_1 U_2}{(V_1 V_2)^{3/2}} \cdot \frac{K_o(W_1 \, d/a_i)}{K_1(W_1) K_1(W_2)} \qquad 6)$$

$$S_i = 1 - (n_{cl}/n_{ci})^2 \qquad 7)$$

where subscripts 1 and 2 relate to cores 1 and 2 respectively, C is the coupling coefficient, $a_i$ is the core radius of a core i, $S_i$ is the numerical aperture of a core i, $\beta_i$ is the propagation constant of a core i, $n_{ci}$ and $n_{cl}$ are the refractive indices of a core i and cladding of fibre, respectively, d is the distance between core centres, $V_i$, $U_i$ and $W_i$ are parameters characterising a core i.

By careful consideration of values for the above parameters it is possible to design and fabricate a two core fibre where optical power coupling occurs over a narrow predetermined bandwidth, centred at a predetermined wavelength.

Indicatively the preferred coupling bandwidth of the two cores 11 and 12, in case of use of erbium as the doping substance for core 11, can be in the range of $\lambda_1 = 1530$ nm and $\lambda_2 = 1540$ nm.

The foregoing means that the light having a wavelength of approximately 1536 nm, which propagates in the active core 11 and substantially constitutes the "background noise" given by the spontaneous emission of erbium, periodically moves from core 11 to core 12, on the basis of the known optical coupling laws, as described for example on pages 84 and 90 in "Journal of the Optical Society of America" A/vol. 2, No. 1, January 1985.

Figure 7:
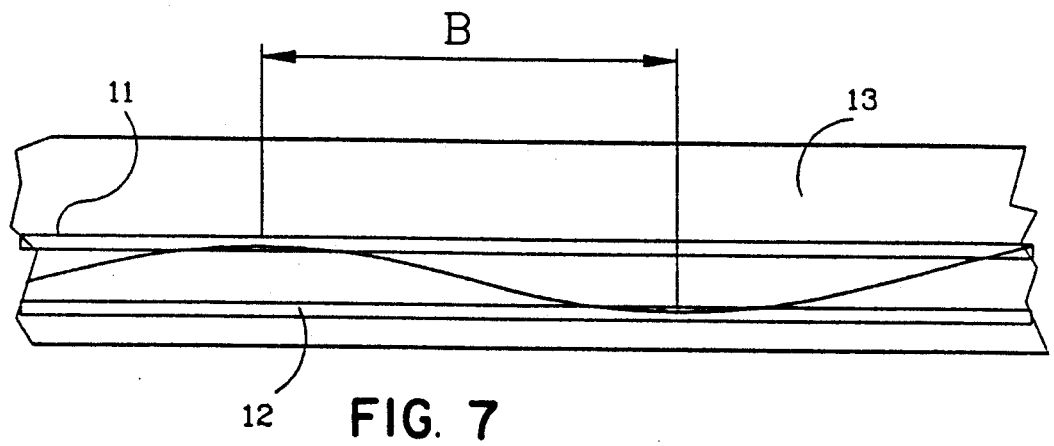
FIG. 7 is a diagram of a fiber portion in accordance with the invention showing the periodic variation curve of the luminous power between the two cores.

The fiber length $L_B$ at which a complete luminous power passage at the coupled wavelength occurs from one core to the other, shown in FIG. 7, is referred to as beat length and depends on the characteristics of the two cores, in particular on the diameters thereof, the refractive indices, the numerical aperture, the relative distance.

The transmission signal present in core 11, instead, has a wavelength $\lambda_s$ different from that at which the coupling between the two cores 11 and 12 occurs, equal to 1550 nm for example, and therefore said signal is confined within the core 11 without being transferred to core 12; in the same manner the pumping light supplied to the core 11 by the coupler 3, at the wavelength $\lambda_p$ of 980 or 540 nm for example, has propagation characteristics in core 11 which exclude its passage to core 12, in the latter being therefore ensured the absence of pumping energy.

Both cores 11 and 12 contain doping substances; in particular core 11, hereinafter also referred to as "active" or "amplifying" core, is doped with erbium, whereas core 12, hereinafter also referred to as "passive" core, is doped with a substance having a high luminous absorption over the whole spectrum or at least at a dopant-emitting peak of the core 11 which is the source of "noise" as previously described, in particular in the presence of the peak at about 1536 nm when erbium is used as laser dopant.

Substances adapted to this end, having a high luminous absorption within the spectrum are described for example in the European Patent Application No. 88304182.1 and generally comprise variable valence elements such as Ti, V, Cr, Fe at their lowest valence state ($Ti^{III}$, $V^{III}$, $Cr^{III}$, $Fe^{II}$).

Among the substances having a high luminous absorption at a particular wavelength, that is at the wavelength of the dopant emitting peak of the "active" core 11 which one wishes to eliminate, it is particularly convenient to use the same dopant as that of said active core; in fact a fluorescent substance supplied with a sufficient amount of pumping energy shows a certain emission at a particular wavelength, whereas the same substance when it is not supplied with a pumping energy absorbs light at the same wavelength as with emission in the presence of pumping.

In particular, in the presence of an erbium-doped "active" core 11, the second core as well can be conveniently doped with erbium.

In this manner, because the erbium absorption curve exhibits a development corresponding to that of its fluorescence or laser emission curve, shown in FIG. 3, it happens that at the stimulated emission peak, at 1536 nm, there is a similar absorption peak at the same wavelength.

As a result, the fluorescence at the coupling wavelength between the cores, that is at 1536 nm, which is produced in the presence of pumping light in the core 11 due to the spontaneous decay of the active dopant (erbium) from the upper laser value 9, is automatically transferred to the core 12 as it is generated; from core 12 however it is not transferred again to core 11, inside which the transition signal is guided, because within said core 12 a substantially complete attenuation of the input light occurs, which light is absorbed by the dopant present therein.

The emission at the undesired wavelength is therefore continuously subtracted to core 11 and dispersed within core 12, so that it cannot come back again to core 11 and cannot be amplified within core 11 thereby subtracting pumping energy to the transmission signal amplification and overlapping it.

The fiber in accordance with the invention therefore carries out a continuous filtering of the light present in core 11 over the whole active fiber length, absorbing the photons emitted at 1536 nm as soon as they are generated by spontaneous decay from the laser emission level of the $Er^{3+}$ ions, thus preventing them from moving forward in the fiber, which will bring about further decays at that wavelength; therefore said fiber allows the sole transmission wavelength and pumping wavelength to be substantially diffused in the core 11.

The transmission wavelength $\lambda_s$ can thus be selected over the whole range at which erbium has an important laser emission value, for example between values $\lambda_2$ and $\lambda_3$ shown in FIG. 3 (indicatively corresponding to approximately 1540–1570 nm), which allows the laser emitter for the transmission signal emission to be freely selected, without incurring in differences of behaviour as regards amplification with signal emitters having different wavelengths included within a tolerance range which is wide enough to accept most of the commercially available semiconductor lasers (In, Ga, As).

The characteristics of a double-core fiber allowing the coupling of the two cores to be carried out within the desired wavelength range can be drawn from the previously mentioned articles.

The amount of erbium present in the active core 11 of the fiber is selected based on the desired gain for the amplifying fiber length used; in other words, the active fiber length is selected so as to achieve a given gain on the basis of the amount of erbium present therein; usually the erbium overall content intended as oxide ($Er_2O_3$) in the active core 11 of the fiber, can vary between 10 and 1000 ppm by weight.

The content of a dopant having a high luminous absorption in the "passive" or "attenuating" core 12 must be related to the beat wavelength $L_B$ so that the extinction length L in the core 12, defined as the length after which the luminous fiber energy is reduced by a factor 1/e [according to the known law relating to the propagation of an optical power in an attenuating medium: $P = P_o e^{-\alpha L}$] is lower at least by an order than the beat wavelength $L_B$ (corresponding to the complete passage of luminous power, at thee coupling wavelength, from a core to the other, as shown in FIG. 7):

$$L < 1/10\, L_B;$$

preferably the characteristics of core 12 and the content of the light absorbing dopant are selected so that an extinction length lower by two orders (a hundredfold) than the beat length is determined.

The dopant content in passive or attenuating core 12 can be equal or higher than the content of amplifying core 11 and can reach up to 10,000 ppm or higher, so as to meet the above specified limitation.

The doping substances can be introduced into the fiber for example through the so-called "solution doping" technique, well known in the art, which ensures satisfactory qualitative results, or through other techniques well known as well, based on particular requirements.

As shown in FIG. 5, the fiber 6 preferably has its core 11 designed to guide the optical signal and receive the pumping light, disposed coaxially within the fiber cladding 13, whereas the second core 12 is disposed at an eccentric location.

In this manner, according to the diagram shown in FIG. 4, the connection between the active fiber 6 and fibers 4 and 7 can be carried out in a traditional manner, without adopting particular expedients, by merely disposing the fiber ends facing each other and using traditional jointing apparatus which carry out the fiber alignment by controlling their outer surfaces so that the core 11 placed in an axial position becomes correspondingly in alignment with the cores of fibres 4 and 7 without any important junction losses; the core 12 which is in an eccentric position must not be connected to other cores and is therefore cut at the ends of the double core fiber 6 without needing further operations.

Preferably, in order to have the highest amplification efficiency, the core 11 is a single-mode core both at the signal wavelength and at the pumping wavelength and also core 12 is a single-mode core at least at $\lambda_s$.

By way of example, an amplifier has been built in accordance with the diagram shown in FIG. 1 and comprising a double-core active fiber 6 of the Si/Al type, doped with $Er^{3+}$, having an overall content of 80 ppm by weight of $Er_2O_3$, distributed in equal parts in the two cores 11 and 12.

Cores 11 and 12 had both the following values:

$a = 3.1 \mu m$ (radius)
$S = 0.105$, (numerical aperture)
$n_1 = 1.462$ (refractive index)
$d/a = 3.5$ (ratio between the separation $d$ of the two cores 11 and 12 and the radius $a$ of the cores: FIG. 5)

Core 11 was coaxial with the outer diameter of the fiber. The active fiber was 30 meter long.

As the pumping laser emitter 5, an argon-ion laser operating at 528 nm and having a power of 150 mW has been used, whereas as the signal laser emitter 2, a commercially available semiconductor laser (In, Ga, As) has been used which had a power of 1 mW and the emission wavelength of which has been measured to 1560 nm.

With said experimental configuration, downstream of the amplifier a gain of 27 dB has been achieved on an input signal attenuated to a value of 0.5 $\mu W$.

The signal attenuation at the amplifier input adapted to simulate a real use condition has been achieved by means of a variable attenuator.

In the absence of a signal a spontaneous-emission level of 10 $\mu W$ has been measured downstream of the amplifier. Such emission, constituting the background noise produced by the amplifier, does not represent an important noise to the signal which is amplified to much higher levels (about 250 $\mu W$).

For comparison, the same transmission laser emitter 2 has been used together with an amplifier having the same structure as in the preceding example but using an active fiber 6 having a single core Si/Al of the "step index" type, doped with $Er^{3+}$, containing 40 ppm by weight of $Er^{3+}$ in the core; the active fiber was 30 meter long.

Said amplifier with a transmission signal at 1560 nm wavelength, has shown a gain lower than 15 dB, the spontaneous emission being of a level comparable to that of the output signal.

In an alternative embodiment, shown in FIGS. 8 to 13, the optical fibre structure is as follows:

$a_1 = 2 \mu m$
$S_1 = 0.196$
$a_2 = 4.45 \mu m$
$S_2 = 0.135$
$d/a_1 = 9$ where core 101 is amplifying core, containing 150 ppm $Er_2O_3$, and core 102 is the attenuating core, containing 10,000 ppm $Er_2O_3$, inserted in a common cladding 103.

The cores are preferably doped also with germania.

The resulting fibre is drawn to a typical outside diameter of 125 $\mu m$. The parameters of core 1 ensures that its second mode cut off is below 980 nm, enabling it to be singlemoded at a chosen pump wavelength of 980 nm.

Figure 11:
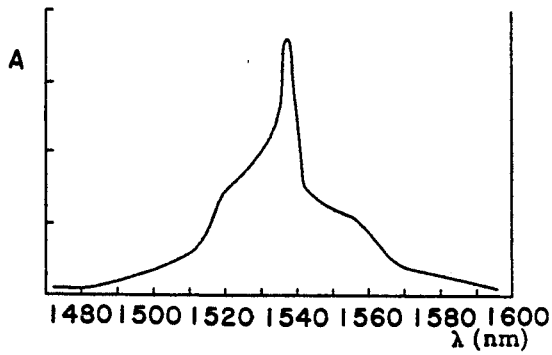
FIG. 11 is the attenuation profile of the attenuating core of the fiber of FIG. 8.

FIG. 10 shows the spectral gain profile of the amplifying core of the fiber, with a main peak narrower than the peak of FIG. 3, while FIG. 11 shows the attenuation profile of the attenuating core.

Figure 12:
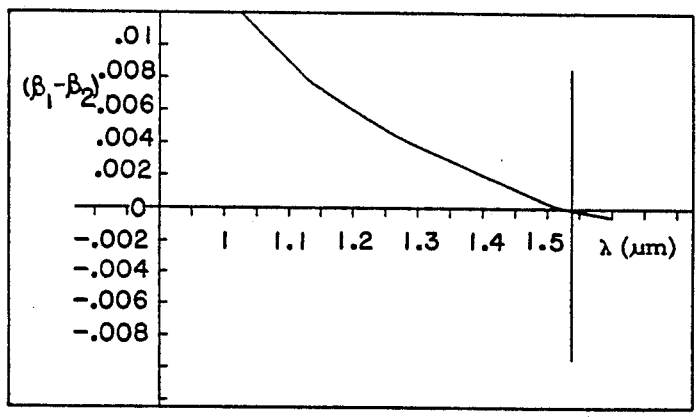
FIG. 12 is the coupling profile of the two cores.

FIG. 12 shows the difference in propagation constants of the cores against wavelengths (i.e. $\beta_1 - \beta_2$) as used in equation 5 and indicates that the wavelength of synchronisation where the propagation constants are equal occurs at 1536 nm, i.e. the peak wavelength of the narrow band.

Figure 13:
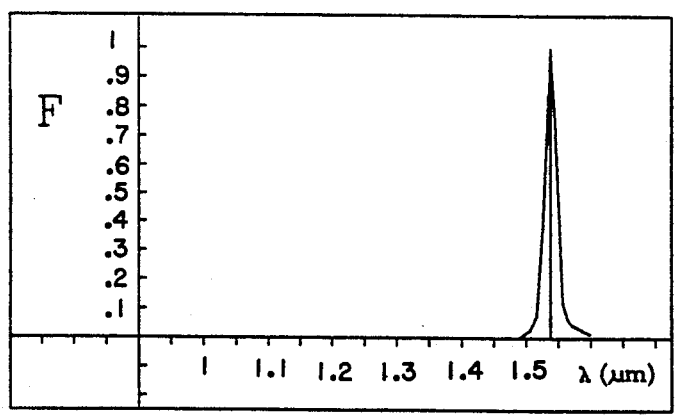
FIG. 13 is the power transfer profile.

FIG. 13 shows the power transfer efficiency between the cores (i.e. F of equation 3) and again shows peak coupling at 1536 nm with considerably less coupling at wavelengths in the broader gain band centred around 1550 nm.

Figure 8:
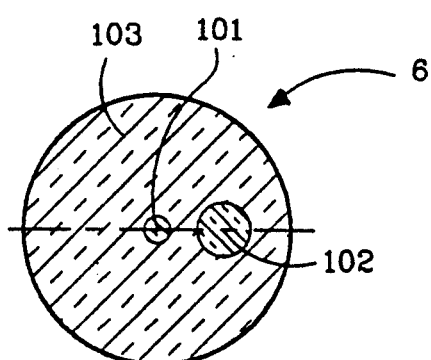
FIG. 8 is a cross section of an optical fibre structure in an alternative embodiment, having an amplifying core and an attenuating core in a common cladding, with different diameters.
Figure 9:
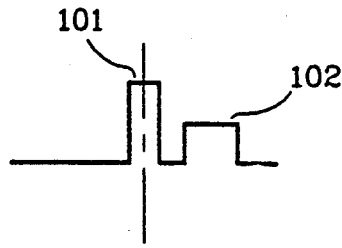
FIG. 9 schematically shows the refractive index profile of the two cores of the fiber of FIG. 8.

The structure of fiber of FIG. 8 (that is a fiber with cores having different diameters) can filter in a narrow band.

This is due to the fact that the wavelength band transferred from the core 101 to the core 102 is very narrow and the ratio between the width of the pass band (not attenuated) and the stop band (attenuated) can be set as desired, choosing the relative diameters of the two cores.

This enables to design a fiber in which the width of the stop band matches the width of the gain peak of erbium of the amplifying core, so that the source of noise can be completely eliminated, without narrowing the band useful for amplification.

Such a fiber is preferred in the case of fiber doped with germania, because this fiber has a very narrow gain peak, as shown in FIG. 10, which can be eliminated without reducing the gain in the band of the transmission signal.

The structure of FIG. 5 (fiber with cores of the same diameter) can filter in a wide band, having the pass band (not attenuated) and the stop band (attenuated) of similar width.

A fiber having a structure of the type of FIG. 5 can be manufactured more easily than a fiber with cores of different diameters; such fiber can preferably be used with fibres having cores doped with alumina, which have a main gain peak of erbium wider than the fibres doped with germania, as shown in FIG. 3.

In these fibres the width of the stop band of the attenuating core is similar to the width of the main peak of erbium, originating the noise.

The optical fibre structure of the invention may be fabricated by inserting core rods into ultrasonically bored holes in a high purity silica, or other soft glass, cladding rod.

The bored hole for the amplifying core rod is concentric with the exterior of the cladding rod and the bored hole for the attenuating core rod is parallel to the bore hole for the amplifying core but offset from the axis of the cladding rod by a predetermined distance.

The core rods can be formed by the solution doping technique or from soft glass rods "caned" from a melt of suitable doped soft glass. When the core rods are fabricated using the solution doping technique, the diameter of the core rods can be controlled by etching or machining.

In an alternative method a preform comprising cladding glass surrounding the amplifying core can be provided and a core rod for the attenuating core inserted into an ultrasonically bored hole in the cladding glass of the preform.

As can be seen from the above examples, while an amplifier with a single-core fiber has shown a reduced gain in the presence of a 1560 nm wavelength signal, also introducing such a noise that the signal reception was difficult, so that said amplifier was practically useless, the amplifier using an active fiber in accordance with the invention, as is apparent from the first mentioned example, has proved its capability of supplying a high amplification gain, in the presence of the same 1560 nm wavelength signal, the background noise introduced therewith being negligible.

Therefore the use of amplifiers in accordance with the invention in a telecommunication line makes said line capable of transmitting signals generated by commercially available laser emitters, a wide production tolerance being accepted for the same and at the same time a substantially constant amplification performance being ensured, independently of the actual emission value of the signal emitter which is used.

Many modifications may be made without departing from the scope of the present invention taken in its general characteristics.

We claim:

1. An optical amplifier having a wide signal band, in particular for optical fiber telecommunication lines (1) operating with a transmission signal in a predetermined wavelength band, comprising a dichroic coupler adapted to multiplex a transmission signal and luminous pumping energy in a sole outgoing fiber and an active optical fiber containing a fluorescent doping substance, connected to the fiber coming out of the dichroic coupler and to a telecommunication line fiber adapted to receive and transmit an amplified signal, characterised in that the active optical fiber (6) is completely formed by two cores (11 and 12, 101 and 102) in a common cladding (13, 103), where the former core (11, 101) is an active or amplifying core containing a fluorescent laser emission dopant in a wavelength range including the wavelength band of the transmission signal and is optically connected at one end to said fiber coming out of the dichroic coupler and, at the other end, to said telecommunication, whereas the other core (12, 102) of the active optical fiber is an attenuating core and contains a substance adapted to absorb luminous energy and is cut at the ends, the two cores being optically coupled to each other in a wavelength band comprised in the range of the laser emission wavelengths of the first core and different from the transmission signal band.

2. An optical amplifier of a wide signal band according to claim 1, characterised in that the second core (12, 102) in the active optical fiber (6) contains a dopant having a high luminous absorption in the laser emission range of the dopant of the first core.

3. An optical amplifier of a wide signal band according to claim 2, characterised in that the dopant having a high luminous absorption in the second core (12, 102) consists of the same fluorescent substance as that present in the first core (11, 101).

4. An optical amplifier of a wide signal band according to claim 1, characterised in that the doping substance in the second core (12, 102) is a substance having a high luminous absorption over the whole spectrum, selected from titanium, vanadium chromium or iron, which are at least partly present in their lowest valence state.

5. An optical amplifier of a wide signal band according to claim 1, characterised in that the content of dopant having a high luminous absorption in the second core (12, 102) and the coupling characteristics of the fiber cores (11 and 12, 101 and 102) are so related that they give rise in the second core to an attenuation length lower than 1/10 of the beat length between the coupled cores in the selected core-coupling band.

6. An optical amplifier of a wide signal band according to claim 5, characterised in that the two cores (11, 12; 101,102) are optically coupled to each other in the wavelength range between 1530 and 1540 nm.

7. An optical amplifier of a wide signal band according to claim 1, characterised in that the fluorescent doping substance present in the first core (11, 101) is erbium.

8. An optical amplifier of a wide signal band according to claim 1, characterised in that the first core (11, 101) is disposed in coaxial relation with the outer fiber surface, in alignment with the core of the fiber coming out of the dichroic coupler and with the core of the telecommunication line fiber (1) to which the amplifier is connected, whereas the second core (12, 102), at the ends thereof, faces the cladding of said fibres.

9. An optical amplifier of a wide signal band according to claim 1, characterised in that at least the active core (11, 101) of the two fiber cores (11 and 12, 101 and 102) is adapted to allow the luminous single-mode propagation at the transmission wavelength and at the pumping wavelength.

10. An optical amplifier according to claim 1, characterised in that the active fiber (6) is longer than half the beat distance of its two coupled cores (11 and 12, 101 and 102) in the selected optical core-coupling band.

11. A double-core active optical fiber (6) comprising fluorescent doping substances, particularly for use in optical fiber amplifiers for optical telecommunication lines, characterised in that it has two optically coupled cores (11 and 12, 101 and 102) uniformly spaced in a common cladding in which the former (11, 101) is an amplifying core and contains a fluorescent doping substance having a stimulated emission in a wavelength range and is adapted to be connected to an optical fiber carrying a telecommunication signal and luminous pumping energy multiplexed in the same fiber, and the second core (12, 102) is an attenuating core and contains a doping substance having high luminous absorption, the maximum optical coupling of the two cores occurring in a wavelength band comprised within said stimulated emission range of the first core and being different from that of the telecommunication signal.

12. A double-core optical fiber comprising fluorescent doping substances to claim 11, characterised in that the dopant having high luminous absorption in the second core (12, 102) consists of the same fluorescent substance present in the first core (11, 101).

13. An optical fiber according to claim 11, characterised in that the doping substance in the second core (12, 102) is a substance having high luminous absorption over the whole spectrum, selected from titanium, vanadium, chromium or iron, which are at least partly present in their lowest valence state.

14. An optical fiber according to claim 11, characterised in that the content of dopant having high luminous absorption in the second core (12, 102) and the coupling characteristics of the fiber cores are so related that they give rise in the second core (12, 102) to an attenuation length lower than 1/10 of the beat length between the coupled cores in the selected core-coupling band.

15. An optical fiber according to claim 11, characterised in that the fluorescent doping substance present in the first core (11, 101) is a wave-hearth dopant.

16. An optical fibre structure as claimed in claim 15 wherein said amplifying core is erbium doped.

17. An optical fibre structure as claimed in claim 16 wherein said amplifying core contains from 10 to 1000 ppm $Er_2O_3$.

18. An optical fiber according to claim 16, characterised in that the two cores (11 and 12) are optically coupled to each other between 1530 and 1540 nm.

19. An optical fibre structure as claimed in claim 1 or 11, wherein said attenuating core contains more than 5000, preferably about 10,000 ppm $Er_2O_3$.

20. An optical fibre structure as claimed in claim 1 or 11 wherein the diameter of amplifying core is equal to that of the attenuating core.

21. An optical fibre structure as claimed in claim 1 or 11, wherein the diameter of the amplifying core (101) is less than the diameter of the attenuating core (102).

22. An optical fiber according to claim 11, characterised in that the first core (11, 101) is disposed in coaxial relation with the outer fiber surface.

23. An optical fiber according to claim 11, characterised in that at least one of the two fiber cores (11 and 12, 101 and 102) is adapted to allow the luminous single-mode propagation at the transmission wavelength and at the pumping wavelength.

24. A method of manufacturing an optical fibre structure as claimed in claim 1 or 11 comprising inserting respective core rods into ultrasonically bored holes in a cladding rod to form a preform.

25. A method of manufacturing an optical fibre structure as claimed in claim 1 or 11 comprising fabricating a preform comprising cladding glass surrounding glass for the amplifying core and inserting a core rod for the attenuating core into an ultrasonically bored hole in the cladding glass of the preform.

* * * * *

UNITED STATES PATENT AND TRADEMARK OFFICE
CERTIFICATE OF CORRECTION

PATENT NO. : 5,087,108
DATED : February 11, 1992
INVENTOR(S) : Grasso et al

It is certified that error appears in the above-identified patent and that said Letters Patent is hereby corrected as shown below:

Col. 4, line 50, change "magnetic" to --energetic--;

Col. 5, line 1, "the" should read --at--;

Col. 8, line 24, "thee" should read --the--.

Signed and Sealed this

Twenty-second Day of June, 1993

Attest:

MICHAEL K. KIRK

Attesting Officer

Acting Commissioner of Patents and Trademarks

UNITED STATES PATENT AND TRADEMARK OFFICE
CERTIFICATE OF CORRECTION

PATENT NO. : 5,087,108
DATED : February 11, 1992
INVENTOR(S) : Grasso et al

It is certified that error appears in the above-identified patent and that said Letters Patent is hereby corrected as shown below:

```
Col. 11, line 29, after "communication" insert --line fiber--
Col. 12, line 38, after "substances" insert --according--.
```

Signed and Sealed this

Seventeenth Day of August, 1993

Attest:

BRUCE LEHMAN

*Attesting Officer*  *Commissioner of Patents and Trademarks*